(12) United States Patent
Freitag et al.

(10) Patent No.: US 7,560,525 B2
(45) Date of Patent: Jul. 14, 2009

(54) CRYSTALLINE POLYPHOSPHONATES AND METHODS RELATED THERETO

(75) Inventors: Dieter Freitag, Chelmsford, MA (US); Pin Go, Lowell, MA (US)

(73) Assignee: FRX Polymers, LLC, Chelmsford, MA (US)

( * ) Notice: Subject to any disclaimer, the term of this patent is extended or adjusted under 35 U.S.C. 154(b) by 503 days.

(21) Appl. No.: 11/097,669

(22) Filed: Apr. 1, 2005

(65) Prior Publication Data

US 2005/0222370 A1    Oct. 6, 2005

Related U.S. Application Data

(60) Provisional application No. 60/558,882, filed on Apr. 2, 2004.

(51) Int. Cl.
*C08G 79/02* (2006.01)
*C08G 79/00* (2006.01)

(52) U.S. Cl. .................. 528/167; 528/398; 528/373; 528/425

(58) Field of Classification Search .................. 528/167, 528/398, 373, 425
See application file for complete search history.

(56) References Cited

U.S. PATENT DOCUMENTS

| | | | |
|---|---|---|---|
| 2,534,242 A | 12/1950 | Cusic | |
| 2,682,522 A | 6/1954 | Coover, Jr. et al. | |
| 2,716,101 A | 8/1955 | Coover, Jr. et al. | |
| 3,153,008 A | 10/1964 | Fox | |
| 3,271,329 A | 9/1966 | Coover, Jr. et al. | |
| 3,326,852 A | 6/1967 | Thomas | |
| 3,442,854 A | 5/1969 | Curtius et al. | |
| 3,932,351 A | 1/1976 | King | |
| 3,932,566 A | 1/1976 | Reader | |
| 3,952,072 A | 4/1976 | Yonemitsu et al. | |
| 4,033,927 A | 7/1977 | Borman | |
| 4,048,106 A | 9/1977 | Hermans | |
| 4,064,107 A | 12/1977 | Stackman et al. | |
| 4,078,016 A | 3/1978 | Kramer | |
| 4,093,582 A | 6/1978 | Mark et al. | |
| 4,152,373 A | 5/1979 | Honig | |

(Continued)

FOREIGN PATENT DOCUMENTS

DE    2909442    9/1980

(Continued)

OTHER PUBLICATIONS

Schmidt et al., Aromatische Polyphosphonate: Thermoplastische Polymere von extremer Brandwidrigeit, 1985, Die Angewandte Makromolekulare Chemie, 132(2165):1-8.

(Continued)

*Primary Examiner*—Duc Truong
(74) *Attorney, Agent, or Firm*—Pepper Hamilton LLP

(57) ABSTRACT

Disclosed are crystalline polyphosphonates and a method to induce crystallization. These crystalline polyphosphonates exhibit a unique and advantageous combination of properties, allowing for solid state post polymerization reactions and solid state dry mixing with other polymers. Also disclosed are polymer compositions that comprise these polyphosphonates and at least one other polymer, wherein the resulting polymer compositions exhibit flame retardant properties. Further disclosed are articles of manufacture produced from these crystalline polyphosphonates and polymer compositions, such as fibers, films, coated substrates, moldings, foams, fiber-reinforced articles, or any combination thereof.

4 Claims, 2 Drawing Sheets

DSC

U.S. PATENT DOCUMENTS

| | | | |
|---|---|---|---|
| 4,254,177 | A | 3/1981 | Fulmer |
| 4,328,174 | A | 5/1982 | Schmidt et al. |
| 4,331,614 | A | 5/1982 | Schmidt et al. |
| 4,332,921 | A | 6/1982 | Schmidt et al. |
| 4,374,971 | A | 2/1983 | Schmidt et al. |
| 4,377,537 | A | 3/1983 | Block et al. |
| 4,408,033 | A | 10/1983 | Hefner, Jr. |
| 4,415,719 | A | 11/1983 | Schmidt et al. |
| 4,474,937 | A | 10/1984 | Bales |
| 4,594,404 | A | 6/1986 | Kawakami et al. |
| 5,003,029 | A | 3/1991 | Ueda et al. |
| 5,034,056 | A | 7/1991 | VonBonin |
| 5,039,775 | A | 8/1991 | Oyaizu |
| 5,086,153 | A | 2/1992 | Oyaizu |
| 5,216,113 | A | 6/1993 | Schulz-Schlitte et al. |
| 5,319,058 | A | 6/1994 | Hattori et al. |
| 5,334,692 | A | 8/1994 | Hess et al. |
| 5,525,681 | A | 6/1996 | Barron et al. |
| 5,639,800 | A | 6/1997 | VonBonin et al. |
| 5,719,200 | A | 2/1998 | Staendeke et al. |
| 5,919,844 | A | 7/1999 | Shimizu et al. |
| 6,066,700 | A | 5/2000 | Konig et al. |
| 6,291,630 | B1 | 9/2001 | Konig et al. |
| 6,861,499 | B2 | 3/2005 | Vinciguerra |
| 2004/0167284 | A1 | 8/2004 | Vinciguerra et al. |
| 2005/0020800 | A1 | 1/2005 | Levchik et al. |
| 2005/0222370 | A1 | 10/2005 | Freitag et al. |
| 2006/0020104 | A1 | 1/2006 | Freitag |

FOREIGN PATENT DOCUMENTS

| | | |
|---|---|---|
| EP | 0077493 B1 | 3/1987 |
| GB | 2043083 | 1/1980 |
| WO | WO 03/029258 A1 | 4/2003 |
| WO | WO 2004/076536 | 9/2004 |
| WO | WO 2004/076537 | 9/2004 |

OTHER PUBLICATIONS

Billmeyer, Textbook of Polymer Science, $2^{nd}$ ed., Wiley Interscience, New York, 1971, pp. 45-52.

Legrand et al., eds., Handbook of Polycarbonates, Marcel Dekker, Inc., New York, 2000 (TOC).

Levchik et al., Overview of Recent Developments in the Flame Retardancy of Polycarbonates, Polymer International, 54(7):981-998.

Cotter et al., Engineering Plastics: A Handbook of Polyarylethers, Science Publ. S.A., Switzerland 1995 (TOC).

Groggins, Unit Processes in Organic Synthesis, $4^{th}$ ed., McGraw Hill Book Co., 1952, pp. 616-620.

Morgan, Condensation Polymers, Wiley Interscience, New York, 1965, pp. 217-223.

CRYSTALLINE POLYPHOSPHONATES AND METHODS RELATED THERETO

RELATED APPLICATION

This application claims priority to of U.S. Provisional Application Ser. No. 60/558,882 filed Apr. 2, 2004 titled "Crystalline Polyphosphonates and Methods Related Thereto", the contents of which are incorporated herein by referenced.

TECHNICAL FIELD

The present invention relates generally to crystalline polyphosphonates that exhibit a novel combination of properties and a method for inducing crystallization. It also relates to polymer compositions comprising these branched polyphosphonates, and flame retardant coatings and articles produced therefrom.

BACKGROUND

Polyphosphonates are known to exhibit excellent fire resistance (see e.g., U.S. Pat. Nos. 2,682,522 and 4,331,614). It is known (see e.g., U.S. Pat. No. 2,682,522) that linear polyphosphonates can be produced by melt condensing a phosphonic acid diaryl ester and a bisphenol using a metal catalyst (e.g., sodium phenolate) at high temperature. This approach produced low molecular weight polyphosphonates that exhibited poor toughness.

Consequently, to improve toughness a synthetic approach to produce branched polyphosphonates by the transesterification process was developed (see e.g., U.S. Pat. No. 4,331,614). This approach involved the transesterification reaction of a phosphonic acid diaryl ester, a bisphenol, a branching agent (tri or tetra phenol or phosphonic acid ester), and a preferred catalyst (e.g., sodium phenolate) carried out in the melt, usually in an autoclave. Several patents have addressed the use of branching agents in polyphosphonates (see e.g., U.S. Pat. Nos. 2,716,101; 3,326,852; 4,328,174; 4,331,614; 4,374,971; 4,415,719; 5,216,113; 5,334,692; and 4,374,971). These approaches have met with some degree of success, however, the combination of properties exhibited by these polyphosphonates are still not sufficient for general acceptance in the marketplace. For example in branched polyphosphonates, the number average molecular weights as high as 200,000 g/mole are claimed with a minimum requirement of 11,000 g/mole (see e.g., U.S. Pat. No. 4,331,614) with polymer dispersities less than 2.5. Consequently these polyphosphonates exhibited high melt viscosities. This approach was successful in producing high molecular weight polyphosphonates that exhibited improved toughness, but processability was sacrificed.

Both linear and branched polyphosphonates produced by the transesterification process exhibited excellent flame resistance, however they generally lack hydrolytic stability and can be degraded by moisture. All polyphosphonates prepared to date are amorphous thermoplastic materials that are not known to crystallize (e.g., form ordered morphological structures). Crystallinity in organic polymers is known to impart some advantageous properties including higher heat distortion temperatures, higher thermal stability and improved solvent and moisture resistance. The ability to crystallize a polymer or prepolymer into a powder form offers several additional advantages. These include enabling additional reactions or operations that can be performed in the solid state such as subsequent reactions to increase the molecular weight or dry mixing with other polymer powders. Performing these steps in the solid state avoids the difficulty of handling high viscosity melt polymerization or melt mixing operations that require specialized equipment, are difficult and expensive.

SUMMARY OF THE INVENTION

In view of the above, there is a need for crystalline polyphosphonates and a method to induce crystallization. Therefore an object of this invention is to provide crystalline polyphosphonates.

Another object of this invention is to provide a method for the crystallizing polyphosphonates. This method enables the preparation of crystalline polyphosphonate powders that in turn enables solid state operations to produce polyphosphonates and polyphosphonate blends with other polymers with an unprecedented combination of properties. For example, the crystalline polyphosphonate powders can be further polymerized in a post reaction that is conducted in the solid state to produce higher molecular weight polyphosphonates with an excellent combination of fire resistance, transparency, processability and toughness. In another example, the crystalline polyphosphonate powders can be efficiently and intimately mixed with other polymer powders in the solid state. Both of these operations avoid the use of solvents and avoid having to manipulate high viscosity melts or solutions. Based on prior art, it was unexpected that polyphosphonates could be made to crystallize, since crystalline polyphosphonates are not known.

It is another object of the present invention to formulate polymer compositions comprising these polyphosphonates and commodity or engineering plastics. A polymer composition comprises at least one polyphosphonate of the present invention with at least one other polymer, which may be a commodity or engineering plastic, such as polycarbonate, polyacrylate, polyacrylonitrile, polyester, polyamide, polystyrene, polyurethane, polyepoxy, poly(acrylonitrile butadiene styrene), polyimide, polyarylate, poly(arylene ether), polyethylene, polypropylene, polyphenylene sulfide, poly (vinyl ester), polyvinyl chloride, bismaleimide polymer, polyanhydride, liquid crystalline polymer, cellulose polymer, or any combination thereof. The polymer composition may be produced from a crystalline polyphosphonate powder and another polymer by blending, mixing, or compounding the constituent polymers. Due to the crystalline polyphosphonates of the present invention, the resulting polymer compositions can be prepared in a dry, solid state mixing operation and avoid the problems and costs associated with handling, mixing and manipulation of high viscosity polymer melts.

It is yet another object of the present invention to produce articles of manufacture from these polyphosphonates or from polymer compositions comprising these polyphosphonates and other polymers. The polyphosphonates and the polymer compositions of the present invention can be used as coatings or they can be used to fabricate free-standing films, fibers, foams, molded articles, and fiber reinforced composites.

The above summary of the present invention is not intended to describe each illustrated embodiment or every implementation of the present invention. The detailed description, which follows, particularly exemplifies these embodiments.

DESCRIPTION OF THE DRAWINGS

For a fuller understanding of the nature and advantages of the present invention, reference should be made to the fol

DETAILED DESCRIPTION OF EXEMPLARY EMBODIMENTS

Figure 1:
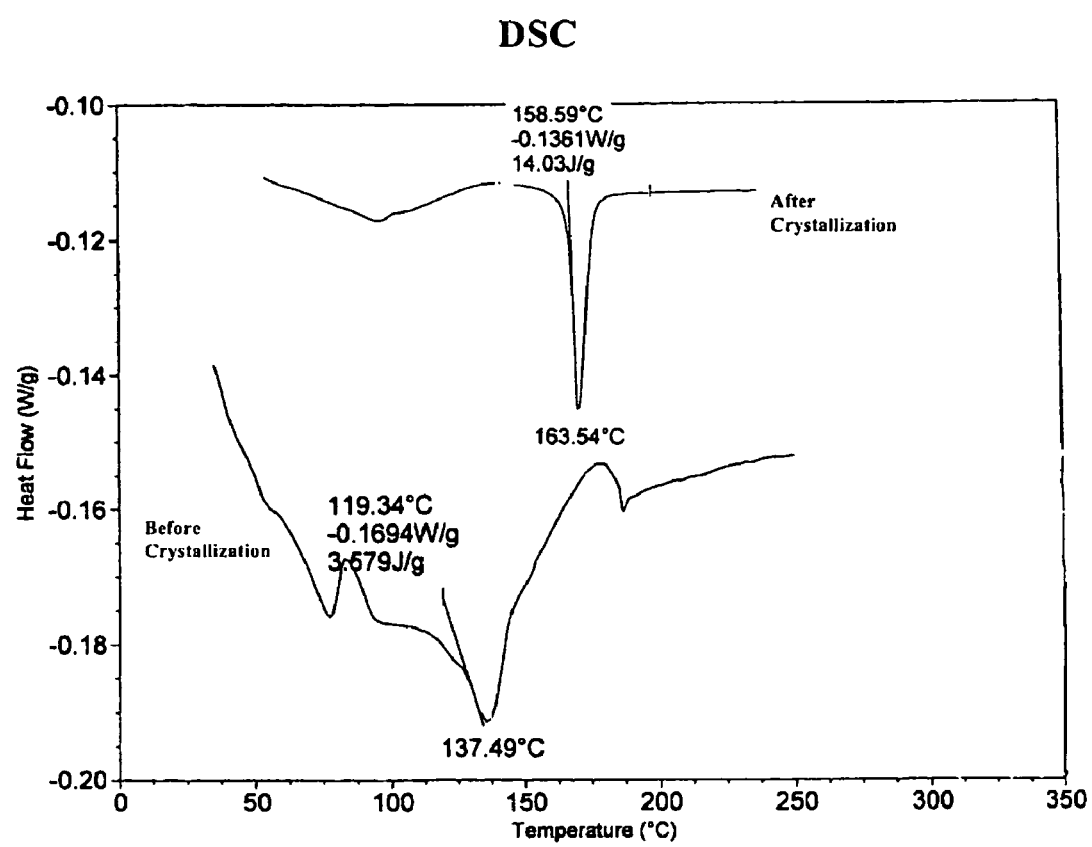
- FIG. 1 shows differential scanning calorimetry (DSC) analysis of a polyphosphonate of Example 2 before and after crystallization.

The present invention pertains to a method for preparing flame retardant, crystalline polyphosphonates having an advantageous combination of properties that allow for solid state polymerization and mixing. The terms "flame retardant", "flame resistant", "fire resistant" or "fire resistance", as used herein, mean that the polymer exhibits a limiting oxygen index (LOI) of at least 27.

The method is conducted by exposing a polyphosphonate sample to a suitable organic solvent or solvent mixtures. The solvent or solvent mixtures can be in liquid or gaseous form. A preferred method is to dissolve the amorphous polyphosphonate in a suitable solvent and subsequently cause the polyphosphonate to precipitate by adding the polymer solution to a nonsolvent. Alternatively, the nonsolvent may be added to the polyphosphonate solution. Another preferred method to induce crystallization is to expose the polyphosphonate to the vapors of a suitable solvent until saturation occurs and subsequently remove the solvent. Another preferred method involves dissolving the amorphous polyphosphonate and then reducing the volume of solvent by thermal treatment. Alternatively, the solvent may be removed by flash evaporation by exposing the solution to high pressure and rapidly reducing the pressure. Other methods of solvent removal such as slow evaporation under vacuum or ambient pressure are also suitable.

The term "solvent" is used herein to describe a liquid or gaseous media that partially of fully dissolves the amorphous polyphosphonate. The term "nonsolvent" is used to describe a liquid or gaseous media that will not substantially dissolve an amorphous polyphosphonate. The term "solvent mixtures" is used to describe more than one solvent and the term "nonsolvent mixtures" is used to describe more than one nonsolvent.

Preferred solvents are organic solvents and can include aliphatic and aromatic hydrocarbons, glycols, amides, lactones, halogenated hydrocarbons but are not limited to these types. Most preferred solvents are those that will fully dissolve the amorphous polyphosphonate. Preferred nonsolvents include water and lower alcohols such as methanol and ethanol or ketones. Most preferred nonsolvents are those in which the crystalline polyphosphonate are completely insoluble.

EXAMPLES

Having generally described the invention, a more complete understanding thereof may be obtained by reference to the following examples that are provided for purposes of illustration only and do not limit the invention.

Example 1

Solvent Induced Crystallization of an Amorphous Polyphosphonate

A 50 mL round bottom flask equipped with a magnetic stirbar was placed a branched polyphosphonate (~2 g). The polyphosphonate was prepared by the transesterification reaction of methyldiphenoxy-phosphine oxide, 4,4'-dihydroxydiphenylphenyl tetraphenylphosphonium phenolate and 1,1,1-tris(4-hydroxyphenyl) ethane according to the U.S. patent application Ser. No. 10/374,829, filed Feb. 24, 2003 and is incorporated by reference. The branched polyphosphonate exhibited a relative viscosity of 1.13 and a Tg of ~137° C. and no melting transition by DSC. Methylene chloride (30 mL) was added to the flask and the polyphosphonate dissolved over about 2 hours with stirring. This solution was subsequently poured into a beaker containing methanol (~150 mL). A precipitate formed immediately, additional methanol ~(100 mL) was added and the mixture was allowed to stand for ~1 hour. The off-white solid was isolated by filtration, washed repeatedly with methanol and allowed to air dry for ~1 hour. The solid was further dried by heating to 70° C. in a forced air oven for ~12 hours. The final solid was off-white with a slight yellow color. This solid was analyzed by DSC and it exhibited no Tg but a sharp crystalline melting transition from 164° C.

Example 2

Solvent Induced Crystallization of an Amorphous Polyphosphonate

A 500 mL round bottom flask equipped with a magnetic stirbar was placed a branched polyphosphonate (5.2 g). The polyphosphonate was prepared by the transesterification reaction of methyldiphenoxy-phosphine oxide, 4,4'-dihydroxydiphenyl, tetraphenylphosphonium phenolate and 1,1,1-tris(4-hydroxyphenyl)ethane according to the U.S. patent application Ser. No. 10/374,829, filed Feb. 24, 2003 and is incorporated by reference. The branched polyphosphonate exhibited a relative viscosity of 1.13 and a Tg of ~137° C. and no melting transition by DSC. Methylene chloride (100 mL) was added to the flask and the polyphosphonate dissolved over about 0.5 hours with stirring. This solution was subsequently placed on a rotary evaporator and the solvent was removed. Warm acetone (~25 mL) was added to the remaining white solid to form a solution. The solution was scratched with a spatula and white crystals immediately formed. The white crystals were collected by filtration, washed with acetone and air dried. The solid was further dried by heating to 60° C. in a forced air oven for ~12 hours. The final solid (4.52 g) was off-white in color. This solid was analyzed by differential scanning calorimetry (DSC) and it exhibited no Tg but a sharp crystalline melting transition from 164° C.

The changes in morphology due to the solvent treatment are readily apparent by differential scanning calorimetry (DSC) analysis depicted in FIG. 1 below. Before applying the crystallization method (e.g., before crystallization), only a glass transition is evident with the midpoint occurring around 137° C. After applying the crystallization method (e.g., after crystallization), no glass transition is evident and a new crystalline melting transition appears around 164° C.

Example 3

Solvent Induced Crystallization of an Amorphous Polyphosphonate

A 500 mL round bottom flask equipped with a magnetic stirbar was placed a branched polyphosphonate (5.0 g). The polyphosphonate was prepared by the transesterification reaction of methyldiphenoxy phosphine oxide, 2,2-bis(4-hydroxyphenyl)propane (bisphenol A), tetraphenylphosphonium phenolate and 1,1,1-tris(4-hydroxyphenyl)ethane according to the U.S. patent application Ser. No. 10/374,829, filed Feb. 24, 2003 and is incorporated by reference. The branched polyphosphonate exhibited a relative viscosity of 1.12 and a Tg of 104° C. and no melting transition by DSC. Methylene chloride (200 mL) was added to the flask and the polyphosphonate dissolved over about 0.5 hours with stirring. The solution volume was reduced to ~30 mL by evaporation and was subsequently poured into a crystallizing dish and heated to about 80° C. for several hours in an oven. The material was further heated to about 80° C. in a vacuum oven. The white solid was manually milled under mild pressure. This solid was analyzed by DSC and it exhibited no Tg but a sharp crystalline melting transition from 109° C.

Figure 2:
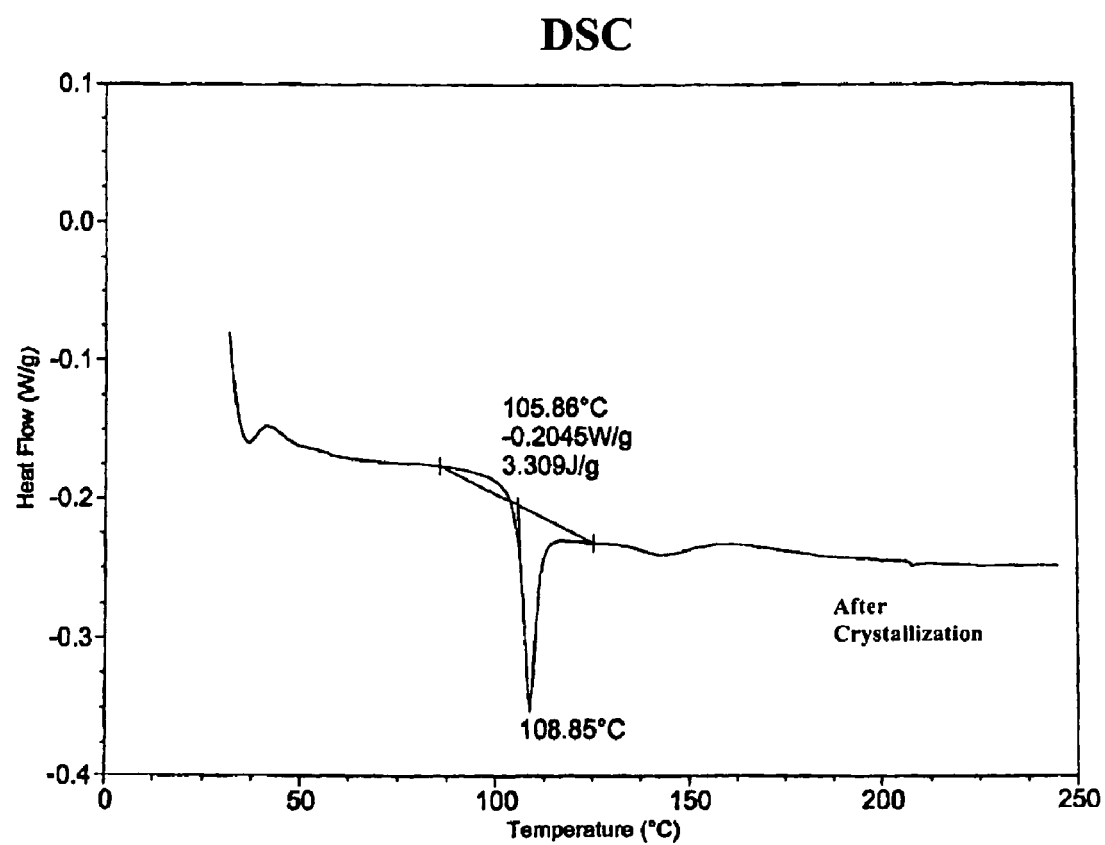
FIG. 2 shows DSC analysis of the polyphosphonate of Example 3 after crystallization.

The DSC curve of the polyphosphonate of Example 3 after crystallization is presented in FIG. 2. This material exhibits a sharp melting transition centered at 109° C. Prior to crystallization, this material was amorphous and exhibited a Tg near 104° C. In this case, the heat distortion temperature is slightly increased.

The results indicate that this is a novel approach to induce crystallinity into polyphosphonates. The heat distortion temperature is increased as evidenced by DSC. Further, it may be possible to effect this change in the solid state by exposing the polyphosphonate to solvent vapors.

Example 4

Preparation and Testing of a Crystalline Polyphosphonate/Polymer Composition

A composition comprising the crystalline polyphosphonate of Example 3 and a commercially available polycarbonate (Makrolon 3107, available from Bayer A.G.). The composition consisted of 80% by weight Makrolon 3107 and 20% by weight crystalline polyphosphonate of Example 3. Multiple samples (3.2 mm thick) from this composition were subjected to UL-94 test. The results were a flame time of 6 seconds for the first two burns and a total of 19 seconds for ten burns. These results correspond to a rating of V0. The Makrolon 3107 without the crystalline polyphosphonate additive exhibited a rating of V2 or higher.

As noted herein, the present invention is applicable to crystalline polyphosphonates, and methods and applications related thereto. The present invention should not be considered limited to the particular examples described above, but rather should be understood to cover all aspects of the invention as fairly set out in the attached claims. Various modifications, equivalent processes, as well as numerous structures, numerous solvents, solvent combinations and methods to introduce the solvent, to which the present invention may be applicable will be readily apparent to those of skill in the art to which the present invention is directed upon review of the present specification.

What is claimed is:

1. Crystalline linear or branched polyphosphonate homopolymers or copolymers having units of the following chemical structure;

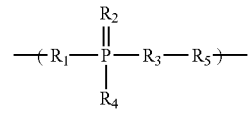

wherein $R_1$, $R_2$ and $R_3$ are independently O or S; at least one of $R_1$, $R_2$ and $R_3$ is O; $R_4$ is a linear or branched C1-C4 alkyl or haloalkyl, phenyl, halophenyl, tolyl, benzyl, biphenyl or cycloalkyl; and $R_5$ is diradical derived from a bisphenol;
  wherein said crystalline liner or branched polyphosphonate homopolymers or copolymers are prepared by a method comprising:
    placing a liner or branched polyphosphonate homopolymer or copolymer in the presence of at least one solvent or solvent vapor;
    saturating the liner or branched polyphosphonate homopolymer or copolymer with said solvent or solvent vapor; and
    removing the solvent or solvent vapor.

2. Crystalline polyphosphonate compositions according to claim 1 wherein $R_1$, $R_2$ and $R_3$ are all O, $R_4$ is a alkyl group and $R_5$ is;

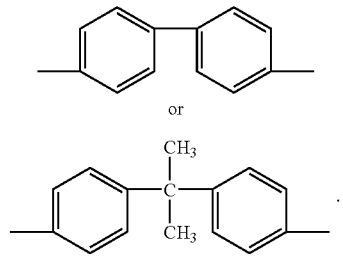

3. An article of manufacture produced from a crystalline polyphosphonate of claim 1.

4. An article of manufacture according to claim 3, wherein the article is a fiber, a film, a coating, a molding, a foam, a fiber reinforced article, or any combination thereof.

* * * * *